Sept. 15, 1964 M. J. CELOVSKY 3,148,446
METHOD AND APPARATUS FOR MANUFACTURING DIES AND ROLLS
Filed May 22, 1961 5 Sheets-Sheet 1
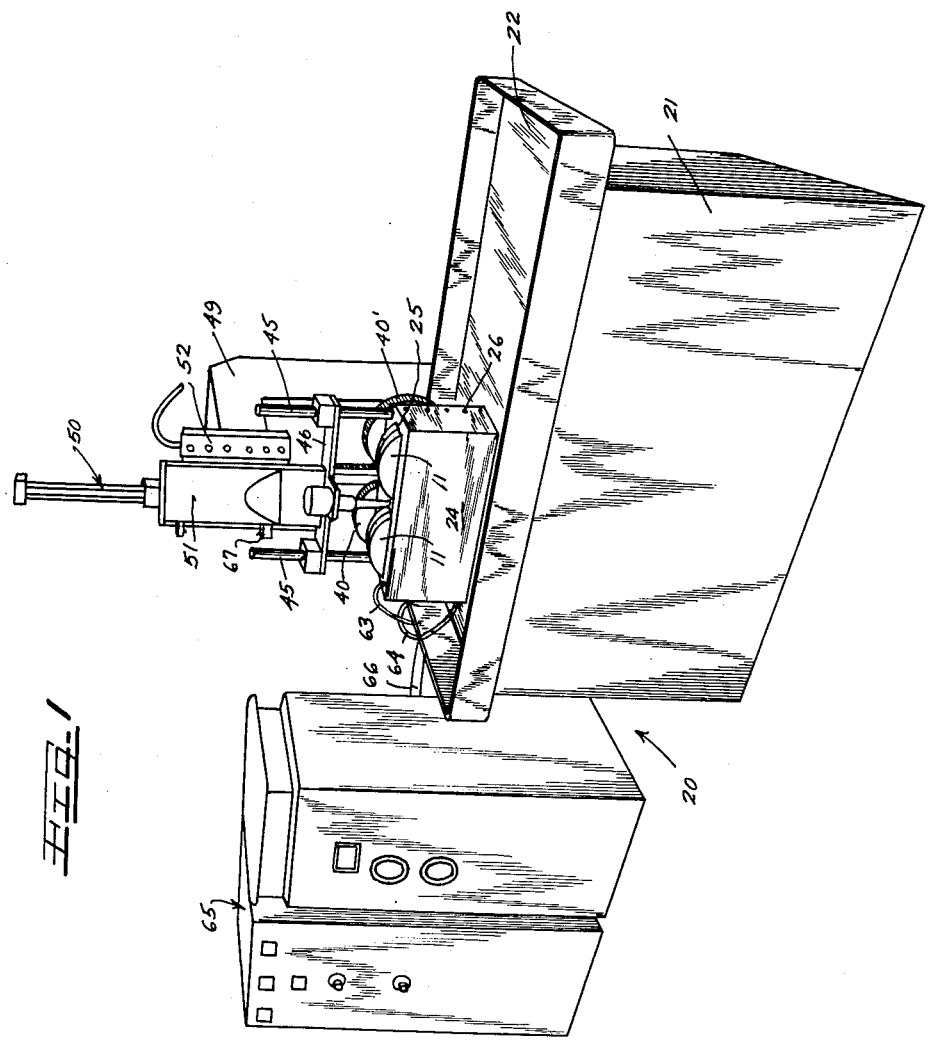
INVENTOR.
Michael J. Celovsky
BY
ATTORNEYS

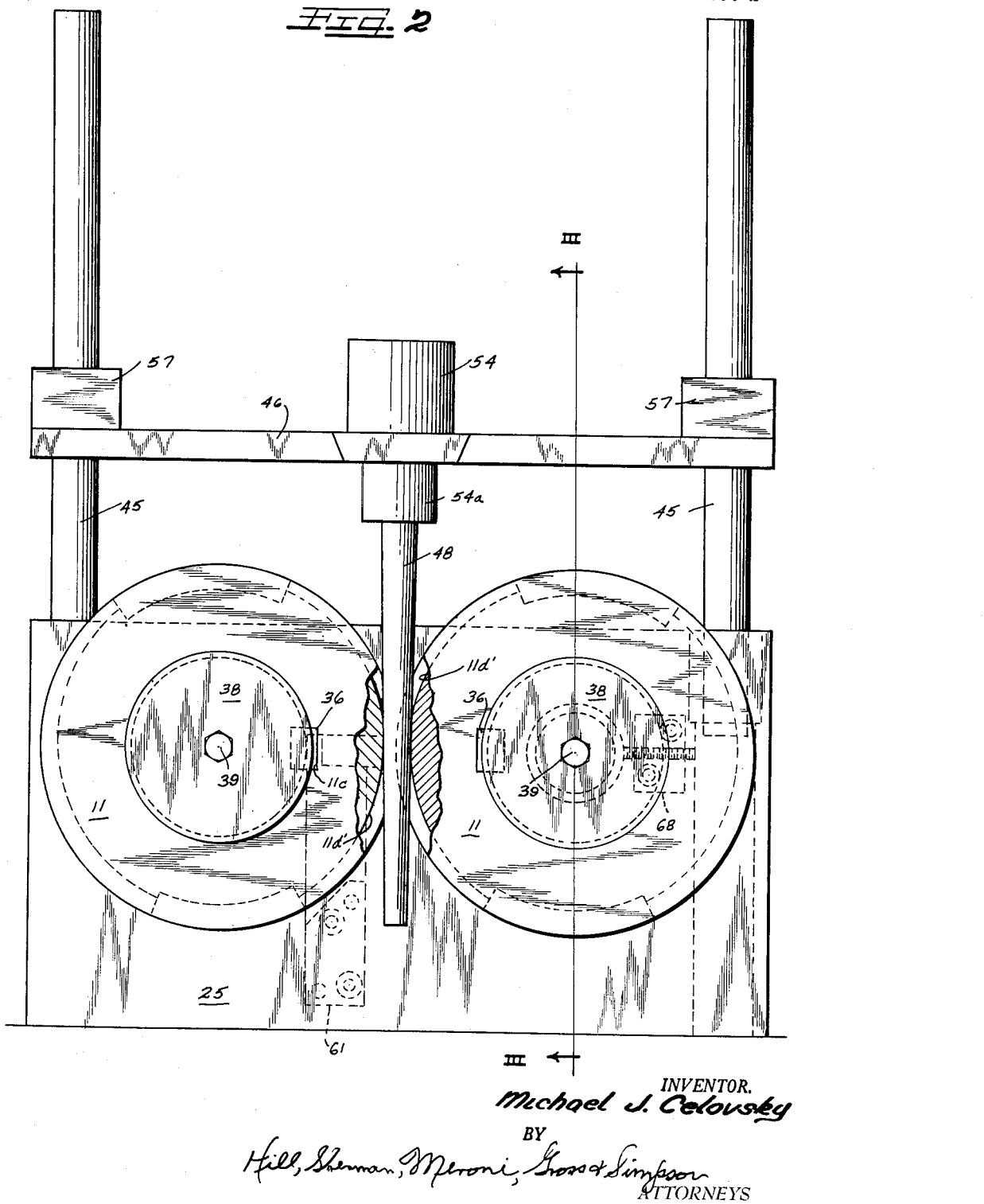

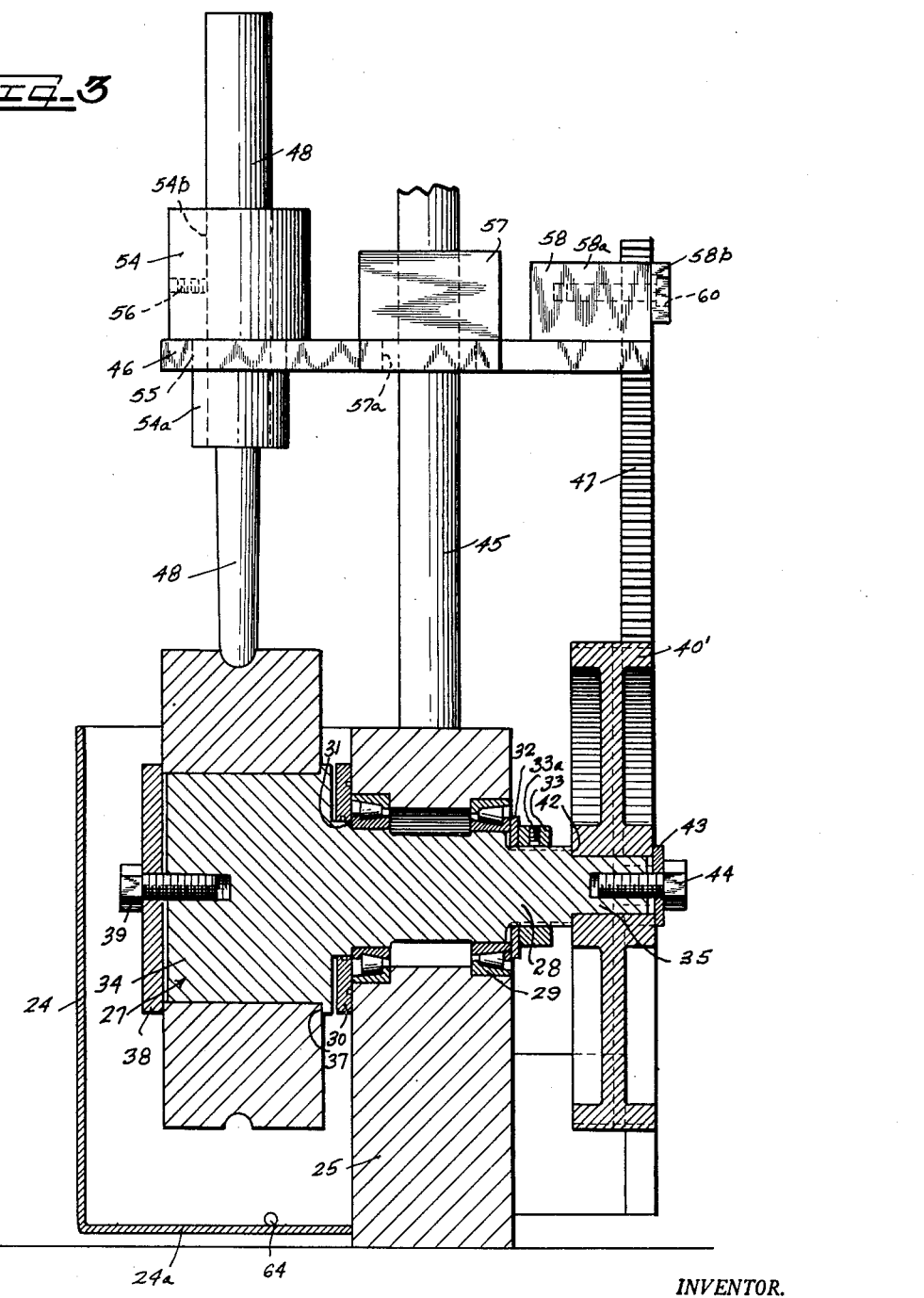

Sept. 15, 1964 M. J. CELOVSKY 3,148,446
METHOD AND APPARATUS FOR MANUFACTURING DIES AND ROLLS
Filed May 22, 1961 5 Sheets-Sheet 4
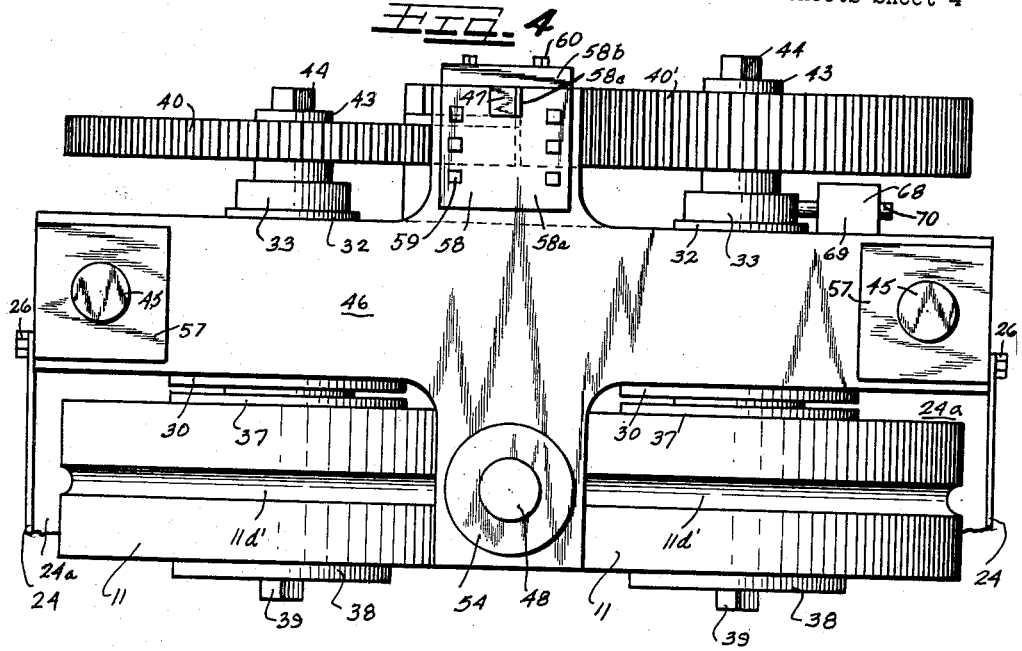
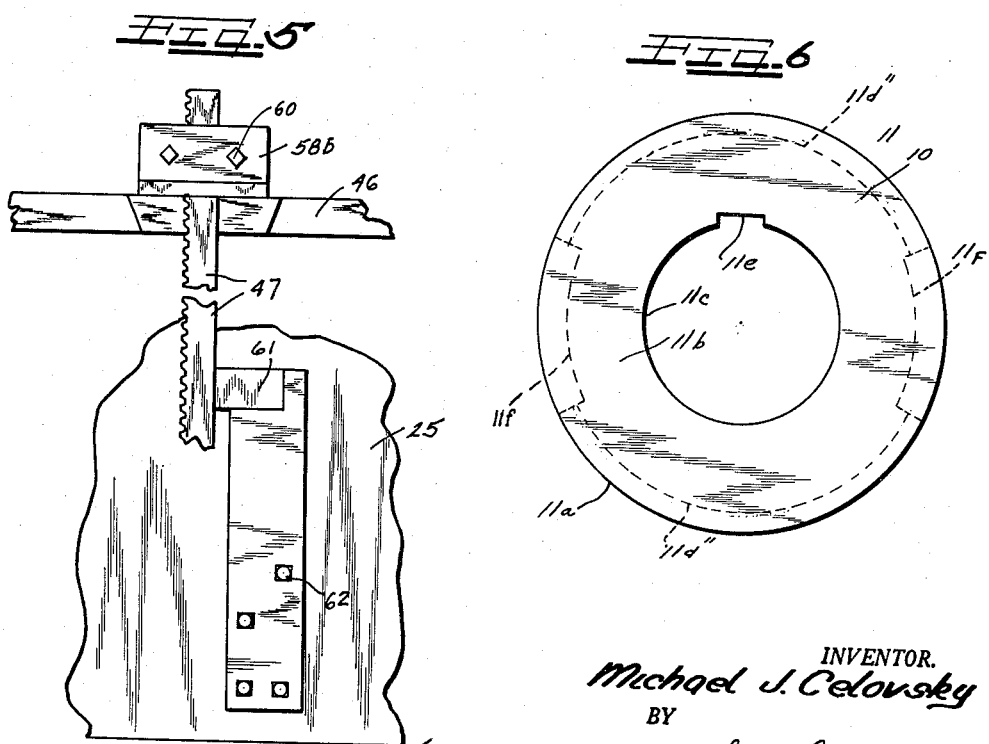
INVENTOR.
Michael J. Celovsky
BY
ATTORNEYS

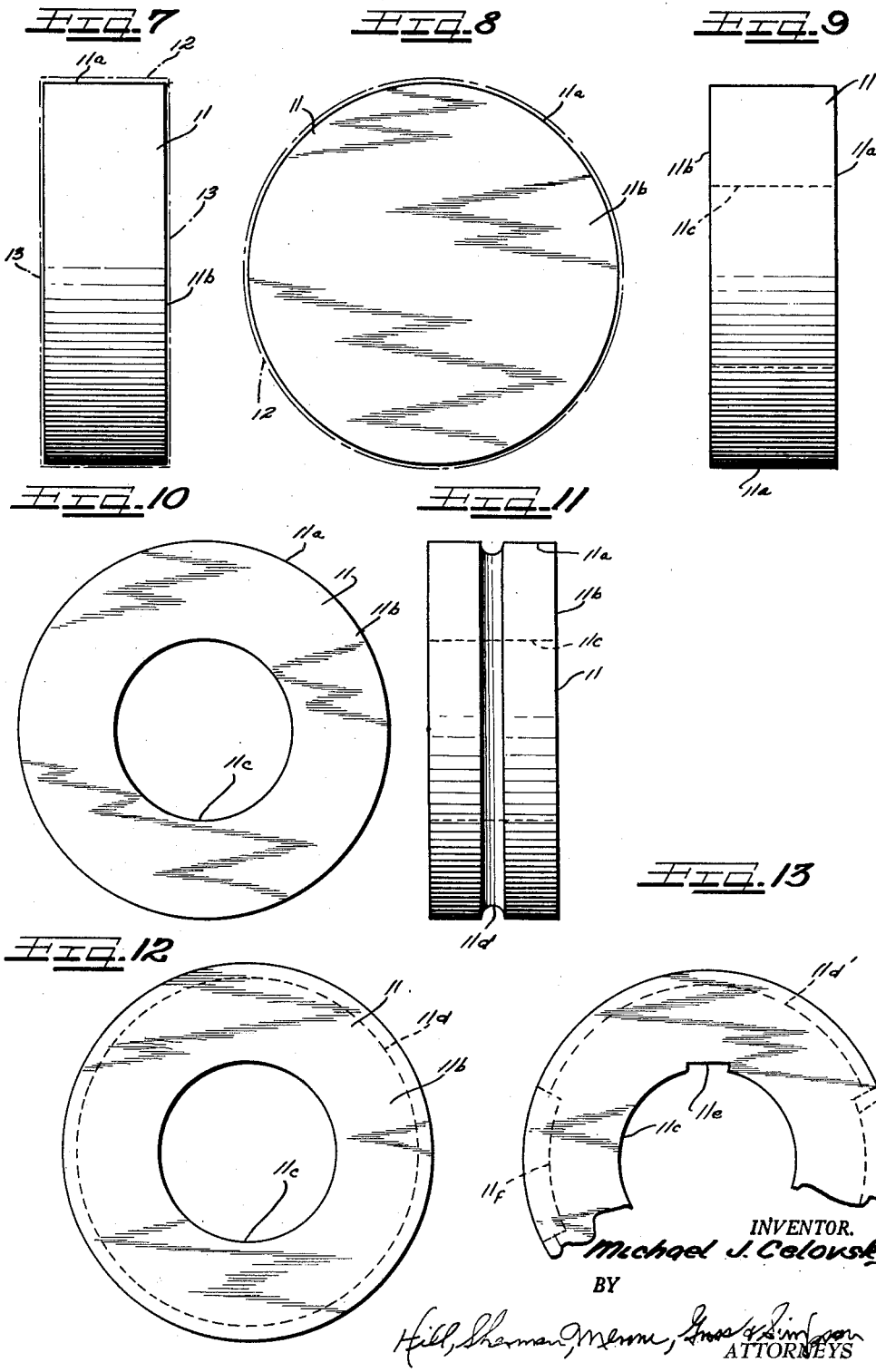

United States Patent Office 3,148,446
Patented Sept. 15, 1964

3,148,446
METHOD AND APPARATUS FOR MANUFAC-
TURING DIES AND ROLLS
Michael J. Celovsky, 14501 Abington Road,
Detroit 27, Mich.
Filed May 22, 1961, Ser. No. 111,541
19 Claims. (Cl. 29—557)

This invention relates to apparatus and method for cutting electrically conductive materials, more especially hard metals such as carbides, tool steels, and stainless steels, by the erosive effect of electric sparks.

More particularly, the present invention relates to an apparatus and method for tapering grooves in articles such as rod or tube reducing metal rolls, ring dies, roll dies, half dies, and the like.

In the past, considerable difficulty has been experienced in the manufacture of tube reducing rolls for it has been necessary to rough machine tapered grooves in the circumference of the rolls in such a way so as to leave enough material so the tapered grooves may be finished after heat treatment by manual methods. The reason for this is that it is virtually impossible to accurately control and maintain any precise dimension in a metallic roll machined therein prior to heat treatment. Once the tool steel has been heat treated the tool steel is too hard to machine and the tapered grooves in the rolls are commonly formed to final shape by hand methods.

In accordance with the present invention, it is now possible to rough and finish machine the circumferential tapered roll grooves as well as relief angles tangent to a radius of the roll in rolls made from hard materials such as tool steel after the rolls have been heat treated so that the time consuming expensive hand methods previously employed are no longer necessary.

An important object of the present invention is to provide a new and improved apparatus and method of manufacturing tube reducing metal rolls so the circumferential tapered grooves may be formed in heat treated material without using the former expensive time consuming practices used to form the tapered grooves to final shape.

Another important object of the present invention is to provide a new and improved apparatus and method of utilizing the erosive effect of electric sparks for tapering the grooves on tube reducing metal rolls while the rolls are in a heat treated hardened state.

Still another important object is to provide an improved apparatus and method for forming tube reducing rolls at a substantially reduced cost.

Yet another object of this invention is to provide a new and improved tube reducing metal roll.

In accordance with certain of the features of this invention a method is provided for forming one or more articles such as a die or a roll or a pair of articles such as dies or tube reducing metal rolls while said article or articles are in a heat treated hardened state. The method of forming rolls includes the steps of disposing a pair of rolls in side-by-side spaced relation in a fluid bath, providing a tapered electrical discharge electrode having a configuration corresponding to the shape of the tapered grooves to be machined in the grooves and aligning the electrode vertically of the gap between the spaced rolls, moving the tapered electrical discharge electrode vertically in the gap between the spaced rolls while contemporaneously rotating the rolls in an arcuate path of rotation on a side of the electrode establishing a cutting zone along the roll surfaces on opposite sides of the electrode, the tapered electrode causing electrical discharge bombardment of the surfaces of the rolls while a constant flow of fluid is directed across the cutting zone thereby machining tapered arcuate tube forming grooves in the rolls, withdrawing the electrode from between the rolls, rotating the rolls exposing other arcuate surfaces of the same rolls for machining, electrical discharge machining a second set of tapered arcuate tube forming grooves in the rolls by repeating the aforesaid steps, and hand polishing the roll surfaces defining the tapered arcuate tube forming grooves providing a 15–20 micro finish thereon.

In accordance with still other features of this invention an apparatus is provided for electro-machining one or more metal rolls while in a heat treated hardened state.

Other objects, features and advantages of the present invention will more readily become apparent from the following detailed description of a preferred embodiment, taken in conjunction with the accompanying sheets of drawings, in which:

FIGURE 1 is a perspective view of an apparatus for machining tapered grooves in a pair of rolls;

FIGURE 2 is an enlarged partially sectioned side elevation of a portion of the apparatus shown in FIGURE 1 illustrating the relationship of the electrode and the rolls being machined;

FIGURE 3 is a vertical section taken substantially on the line III—III of FIGURE 2 looking in the direction indicated by the arrows;

FIGURE 4 is a fragmentary top plan view of the apparatus shown in FIGURES 2 and 3;

FIGURE 5 is an enlarged fragmentary detailed view;

FIGURE 6 is a side elevation of a tube reducing metal roll, as produced in the instant apparatus and method;

FIGURE 7 is an edge elevation of a roll blank;

FIGURE 8 is a front side elevation of the roll blank shown in FIGURE 7;

FIGURE 9 is an edge elevation of the blank shown in FIGURE 8 only with the blank having a machined bore;

FIGURE 10 is a side elevation of the blank shown in FIGURE 9;

FIGURE 11 is an edge elevation similar to FIGURE 9 only with a circumferential groove machined therein;

FIGURE 12 is a side elevation of a blank shown in FIGURE 11; and

FIGURE 13 is a side elevation of the blank shown in FIGURE 12 only with the blank provided with a machine keyway therein.

As shown on the drawings:

The reference numeral 10 in FIGURE 6 indicates a tube reducing metal roll and the present invention concerns a new method and apparatus for producing the same. The method will now be described.

In FIGURES 7–13, the step-by-step method of manufacturing the roll 10 is shown in detail. The reference numeral 11 indicates a conventionally machined cylindrical blank and dash-dot lines 12 and 13 illustrate the manner in which outer cylindrical roll surface 11a and opposite ends or end faces 13 are machined to shape (FIGURES 7 and 8).

The blank 11 is then centrally bored to provide it with an axial central roll passageway or roll bore 11c, as illustrated in FIGURES 9 and 10. Any suitable apparatus may be used for machining the surfaces 11a and 11b and for boring the blank 11 to provide the passageway 11c.

Before the roll blank 11 is subjected to a hardening process, an annular or circular groove 11d is burned in the outer circumference or outer annular surface 11a of the roll blank 11 in some types of steel. The relief angles are also burned in before the hardening process in certain types of steel. A sufficient amount of material is left on the grooved roll surface area 11d so that it may be subsequently finished machined to final shape after the roll blank 11 has been quenched.

A keyway 11e is then machined longitudinally of the roll blank 11 along the annular bore surface 11c which defines the internal bore (FIGURE 13). Relief grooves or grooved areas 11f are then burned in the outer cylindrical roll surface 11a. It will be noted the relief grooved areas 11f are disposed 180° apart and divide the annular groove 11d into a pair of arcuate grooved areas 11d'.

The roll blanks formed in accordance with the aforesaid steps are then heated to a suitable temperature and quenched hardened or hardened in any suitable way. After the hardened roll blanks 11 have cooled, the external roll surface areas may be further machined to remove any scale. A grinding process may be very effectively used to remove the scale.

According to the present invention, the arcuate grooves 11d' are then burned with an electrical spark discharge to form arcuate tapered grooves or arcuate tapered grooved surface areas 11d''. By this technique, conventional hand methods of forming tapered grooves on a forming roll are no longer necessary and the expense of producing the roll 10 may be substantially reduced. By varying the electrical spark discharge, the rate of burning may be controlled to obtain a rough cut or burn or a smooth burn or cut. By the use of this technique it is also possible to burn the tapered groove 11d'' in such a way that it does not need polishing. The finish obtained may be varied by altering the rate of electrical spark discharge and/or the gap size between the rolls as will hereafter be discussed in further detail.

As shown in FIGURE 2, it is now possible to simultaneously form the tapered grooves in a pair of forming rolls according to the present method. The tapered surface areas 11d'' may be fine finished if desired by rubbing orange wood thereagainst. As illustrated, the tapered grooves 11d'' are adapted to reduce different sized tubes with one of the grooves 11d'' adapted to reduce 1¼ inch tube stock to one-inch and with the other groove 11d'' adapted to reduce the one-inch stock to ¾ inch.

The reference numeral 20 indicates generally an apparatus or machine for finish machining grooves in the tube reducing rolls 11, as described above in the method of manufacturing the rolls. The machine 20 includes a base 21 having an oil overflow trough 22 at its top surface. Mounted in the overflow trough 22 is a fluid bath 24.

The bath 23 includes a U-shaped plate 24 having a bottom 24a integral therewith and it further includes a tube reducing roll supporting block 25 at its rear side. The U-shaped plate 24 is secured to opposite ends of the roll supporting block 25 by fasteners 26 as shown in FIGURE 4.

The roll supporting block 25 supports roll supporting and indexing means indicated generally at 27. The roll supporting and indexing means includes a pair of arbors or spindles 28 which each extend through the block 25 and are supported thereon in an identical manner by suitable bearings such as the roller bearing assembly 29. To protect the bearings 29 from the oil bath, O-rings 30 are provided on the spindles 28 at the side of the bearings 29 which would otherwise be exposed to the oil in the bath, as shown in FIGURE 3.

It will be noted the spindle 28 has an arbor shoulder 31 engaged against the roller bearing assembly 29 at its outer end and that a pair of rings 32 and 33 are disposed at its inner end and secured to the spindle 28 by a set screw 33a to prevent axial movement of the spindle 28 with respect to the block 25.

Each of the spindles 28 includes an outer end or roll supporting end 34 and an inner end or gear or indexing wheel supporting end 35. The rolls 11 may be mounted on the roll supporting ends 34 of the spindles by aligning the keys 36 with the keyways 11e and pressing the rolls inwardly against the roll engaging spindle shoulders 37. A plate 38 and a bolt 39 are provided to clamp the roll 11 against roll engaging arbor or spindle shoulders 37 to preclude axial movement of the roll 11. In this regard it will be noted in FIGURE 3, that the bolt 39 is threadingly engaged with the outer spindle end 34.

Mounted on the opposite ends 35 of the spindles are a pair of gears 40 and 40' which gears are disposed in spaced relation to one another in order that a rack 47 may extend therebetween for actuating the gears 40 and 40', the arbors or spindles 28, and the rolls 11. The gears 40 and 40' are of the same diameter so that the rolls 11 may be rotated at the same rate.

The gear end 35 of the spindle 28 has gear engaging arbor or spindle shoulders 42 against which the gears 40 are engaged. A plate 43 and a bolt 44 are provided to bolt each of the gears 40 to the inner or reduced end 35 of its associated spindle 28.

A pair of posts 45 are secured to the block 25 and extend above the block 25. An electrode and rack supporting plate 46 is mounted in vertically slidable relation on the posts. Secured to the plate 46 is a rack 47 and a tapered electrode 48. The base 21 has an arm 49 which supports a conventional type hydraulic mechanism 50 which includes a hydraulic cylinder 51 and the cylinder is connected to the plate 46. As the plate 46 is moved vertically on the posts 45 through the operation of the hydraulic mechanism, the rack and the electrode move contemporaneously therewith. The rack 47 is in mesh with the wider gear 40' and the wider gear 40' is in mesh with the gear 40. During this movement, the rack 47 causes the gears 40 and 40' to turn thus rotating the rolls toward one another at the same speed and towards the electrode as the tapered electrode is moved between the rolls to machine a taper in each of the grooves 11d' in the rolls 11.

Any suitable means may be employed for actuating the plate 46. The means illustrated, namely, the hydraulic mechanism 50 has a control panel 52 to enable the plate 46 and the electrode 48 to be advanced downwardly automatically at a pre-set rate which rate may be varied in accordance with the particular job requirements.

A bushing 54 is mounted on the plate 46 and a reduced bushing portion 54a extends through plate opening 55 on the plate. The bushing 54 has a central bore 54b and the tapered electrode 48 is disposed within the bore 54b. A set screw 56 is provided for securing the bushing 54 with the electrode 48. It is in this way that the relative position of the electrode 48 may be adjusted with respect to the plate 46. In view of the foregoing it will be thus perceived that the bushing 54 is carried on and supported by the plate 46.

It will further be noted the posts 45 are mounted on the plate 46 in much the same way as the electrode 48. In this connection it will be seen from FIGURE 4 the plate 46 has a pair of bushings 57 which are mounted on the plate and that the posts 45 extend therethrough. In FIGURE 3, the bushing 57 is shown as having a reduced bushing portion 57a for the purpose of maintaining posts 45 out of contact with the plate 46. The bushing 57 acts as an electrical insulator.

The rack 47 is mounted on the plate 46 by means of an insulated rack clamping device 58. The rack clamping device includes a main rack clamp block 58a and a rack clamp plate 58b. Fasteners 59 are provided securing the main rack clamp block 58a to the plate 46. The main rack clamp block has a recess 58c in which the rack 47 is disposed. The rack clamp plate 58b abuts against the rack 47 and functions to hold the rack 47 in clamped relation in the recess 58c. A second set of fasteners 60 are provided securing the plate 58b to the main block 58a. The block 58a and the plate 58b are also made of a suitable electrical insulator material so that the rack 47 is electrically insulated from the plate 46.

In the vertical movement of the rack 47, a rack back-up 61 is secured to the block 25 by means of bolts 62 and engaged against the rack. The purpose of the rack back-up 61 is to prevent the rack 47 from bending away from the gear 40' as the rack 47 is moved vertically to rotate the gear 40'.

In the operation of the apparatus 20, oil or electrolyte is circulated into the fluid bath through fluid inlet line 63 (FIGURE 1) and out of the fluid bath through fluid outlet line 64. During the machining operation, the oil is preferably circulated continuously and periodically cleansed so that the machining operation may be carried out in the most efficient manner possible. Disposed within the base 21 is a motor, a pump, and a reservoir for the electrolyte or the dielectric fluid and these are conventional such as are found in the Rudorff Patent 2,526,423.

The apparatus 20 further includes a control unit 65 which permits the electric spark discharge from the electrode 48 to the rolls 11 to be varied depending upon the finish that is to be machined on the rolls 11. An electrical line 66 extends from the control unit 65 to the plate 46 and it is in this way that the high current is transferred to the electrode 48. To effect electrical discharge from the electrode 48, the negative pole of the supply circuit is connected to the plate 46 and the positive is connected to the work piece 6 or rolls 11. The electrical principles for effecting electric spark machining or cutting of metal are well known in this art.

Once the electrode 48 is energized and brought in proximity to the rotating rolls 11 through the operation of the hydraulic mechanism 50, while electric spark machining of the roll commences. It will be seen that the electrode is tapered and that its opposite sides which are adapted to confront the roll grooves are identical in configuration and it is in this way that identical tapered grooves may be machined in each of the rolls 11 simultaneously. A limit switch 67 is provided on the cylinder 51 so that when the electrode completes its downward stroke, the limit switch will be actuated and the electrode 48 will be retracted with the plate 46 and the rack 47.

A second set of grooves in the roll may be machined by operating the spindle brake 68 (FIGURE 4). The spindle brake 68 comprises a block 69 having a threaded pin 70 extended transversely through the block. This threaded pin is adapted to engage the spindle 33 to prevent the spindle from rotating. The bolts 39 and the roll plates 38 are then removed and the rolls are switched from one spindle or arbor to the other so that the roll groove surfaces which are yet to be machined may be exposed for cutting by repeating the cutting operation. In other words, after the rolls 11 have been remounted on the spindles and after the plates 38 and the bolts 39 have been fixed in place, the electrode 48 may again be moved vertically in the gap between the rolls to effect electrical discharge bombardment of the grooves for tapering them. During the machining operation the surface of the electrode 48 is at all times maintained in spaced relation with respect to the surface of the rolls being machined to prevent a short circuit. The spacing between the electrode and the surface being machined may be varied to vary the finish being machined on the rolls. During the machining operation, the oil is continuously circulated about the electrode so that the cut metal particles are conveyed away from the cutting area. If the oil in the bath 24 overflows, it is collected in the trough 22 which then causes the overflow oil to flow into the oil reservoir so that it may be continuously used in the cutting operation.

It will be understood that modifications and variations may be effected without departing from the scope of the novel concepts of the present invention.

I claim as my invention:

1. In a method of forming a pair of tube reducing metal rolls while in a heat treated hardened state which includes the steps of disposing a pair of rolls in side-by-side spaced relation in a fluid bath, providing a tapered electrical discharge electrode having a configuration corresponding to the shape of the tapered grooves to be machined in the grooves and aligning the electrode in the gap between the spaced rolls while contemporaneously rotating the rolls in an arcuate path of rotation on a side of the electrode establishing a cutting zone along the roll surfaces on opposite sides of the electrode, the tapered electrode causing electrical discharge bombardment of the surfaces of the rolls while a constant flow of fluid is directed across the cutting zone thereby machining tapered arcuate tube forming grooves in the rolls, withdrawing the electrode from between the rolls, rotating the rolls exposing other arcuate surfaces of the same rolls for machining, electrical discharge machining a second set of tapered arcuate tube forming grooves in the rolls by repeating the aforesaid steps and polishing roll surfaces defining the tapered arcuate tube forming grooves providing a 15–20 micro finish thereon.

2. In a method of finish machining grooves in tube reducing metal rolls while in a heat treated hardened state which includes the steps of disposing a pair of rolls in side-by-side spaced relation in a fluid bath, providing a tapered electrical discharge electrode having a configuration corresponding to the taper to be machined in the grooves and aligning and moving the electrode in the gap between the spaced rolls while contemporaneously rotating the rolls towards the electrode in arcuate paths of rotation and establishing a cutting zone along the roll surfaces on opposite sides of the electrode, the tapered electrode causing electrical discharge bombardment of the surfaces of the rolls while a constant flow of fluid is directed across the cutting zone thereby machining tapered arcuate tube forming grooves in the rolls, withdrawing the electrode from between the rolls, rotating the rolls exposing other arcuate surfaces of the same rolls for machining, and electrical discharge machining a second set of tapered arcuate tube forming grooves in the rolls by repeating the aforesaid steps.

3. In a method of finish machining grooves in tube reducing metal rolls while in a heat treated hardened state which includes the steps of disposing a pair of rolls in side-by-side spaced relation in a fluid bath, providing a tapered electrical discharge electrode having a configuration corresponding to the taper to be machined in the grooves and aligning and moving the electrode in the gap between the spaced rolls while contemporaneously rotating the rolls towards the electrode in arcuate paths of rotation and establishing a cutting zone along the roll surfaces on opposite sides of the electrode, and causing the tapered electrode to emit an electrical spark discharge to effect cutting of a taper in the grooves as it is moved between the rolls while a constant flow of fluid is directed across the cutting zone.

4. In a method of machining grooves in a metal roll while in a heat treated hardened state which includes the steps of disposing a pair of rolls in side-by-side spaced relation in a fluid bath, providing a tapered electrical discharge electrode having a configuration corresponding to the groove shape to be machined in the metal rolls and aligning and moving the electrode in the gap between the spaced rolls while contemporaneously rotating the rolls toward the electrode in arcuate paths of rotation establishing a cutting zone along the roll surfaces on opposite sides of the electrode, and causing the tapered electrode in its movement between the rolls to emit an electrical spark discharge to effect cutting of grooves in the surfaces of the rolls while a constant flow of fluid is directed across the cutting zone.

5. In a method of finish machining a groove in a tube reducing metal roll while in a heat treated hardened state, the steps of providing an electrical discharge electrode having a configuration corresponding to the shape of the groove to be machined in a roll, aligning and moving the electrode along an edge surface of a roll while contemporaneously moving the roll in an arcuate path on one side of the electrode establishing a cutting zone along the roll surface opposite the electrode, and causing the electrode to emit an electrical spark discharge to effect cutting of a groove in the roll as the roll and the electrode are moved relative to one another while a constant flow of fluid is directed across the cutting zone.

6. In a method of finish machining grooves in tube reducing metal rolls while in a heat treated hardened state, the steps of disposing a pair of rolls in side-by-side spaced relation, providing a tapered electrical discharge electrode having a configuration corresponding to the taper to be machined in the grooves, connecting the rolls to a positive pole of a source of direct current supply, the negative pole whereof is connected to the electrode and aligning and moving the electrode in the gap between the spaced rolls while contemporaneously rotating the rolls toward the electrode in arcuate paths of rotation and establishing a cutting zone along the roll surfaces on opposite sides of the electrode, and causing a spark discharge between the electrode and the rolls and thereby cutting a taper in the grooves as the rolls and the electrode are moved relative to one another while a constant flow of fluid is directed across the cutting zone thus preventing the formation on an arc.

7. In an apparatus for machining a groove in an article while in a heat treated hardened state which includes a fluid bath, means for supporting an article in said bath, a tapered electrical discharge electrode having a configuration corresponding to the groove shape to be machined in the metal article being mounted adjacent the article, means for moving the electrode tangentially of the article while contemporaneously moving the article in an arcuate path of rotation on a side of the electrode to establish a cutting zone along the article surface opposite the electrode, and means for causing the tapered electrode to emit an electrical spark discharge to effect cutting of the groove in the opposed surface of the article while a constant flow of fluid is maintained about the cutting zone.

8. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls.

9. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls, said electrode being retractable out of said gap, and mounting means enabling said rolls to be rotated to expose a second set of grooves so a taper may be machined therein in the same manner.

10. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls, the reduced end of the tapered electrode being movable between the rolls in advance of the progressively thicker portions of the tapered electrode.

11. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls, said means for maintaining a pair of rolls in side-by-side spaced relation comprising a pair of spindles on which the rolls may be clamped.

12. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls, said means for maintaining a pair of rolls in side-by-side spaced relation comprising a pair of spindles on which the rolls may be clamped, said means for moving the electrode in the gap while contemporaneously rotating the rolls including a vertically movable rack and gears in mesh with the rack, the gears being mounted on said spindles for rotating the rolls toward one another.

13. In an apparatus for finish machining grooves in tube reducing metal rolls while in a heat treated hardened state which includes a fluid bath, means for maintaining a pair of rolls in side-by-side spaced relation in said fluid bath, the apparatus having a tapered electrical discharge electrode with a configuration corresponding to the taper to be machined in the grooves, means for moving the electrode in the gap between the spaced rolls while contemporaneously rotating the rolls toward the electrode in arcuate paths of rotation to establish a cutting zone along the roll surfaces on opposite sides of the electrode, and means for enabling the tapered electrode to cause electrical discharge bombardment of the surfaces of the rolls while a constant flow of fluid is directed across the cutting zone to machine tapered arcuate tube forming grooves in the rolls, said means for maintaining a pair of rolls in side-by-side spaced relation comprising a pair of spindles on which the rolls may be clamped, said means for moving the electrode in the gap while contemporaneously rotating the rolls including a movable rack and gears in mesh with the rack, the gears being mounted on said spindles for rotating the rolls toward one another, said electrode and said rack being connected together and further joined with an actuator for actuating the electrode and the rack.

14. In an apparatus for rough and finish machining grooves in tube reducing metal rolls while in a heat treated hardened state which includes a base, a fluid bath mounted on said base including a block, spindles mounted on said block having means at one end for clamping metal rolls thereon and having gears clamped on an opposite end, a plate positioned above the bath and carried by the base, a tapered electrode and a rack mounted on said plate, the electrode being aligned with a space between the spindles for movement between metal rolls to be machined, the rack being in mesh with said gears, means for actuating the plate causing the electrode to be actuated and causing the rack and gears to rotate the spindles towards the electrode, and means for causing electrical discharge from the electrode against metal rolls for machining the same.

15. In a method of finish machining a groove in an article while in a heat treated hardened state, the steps of providing an electrical discharge electrode having a configuration corresponding to the shape of the groove to be machined in the article, aligning and moving the electrode with respect to an edge surface of the article while contemporaneously moving the article in an arcuate path on a side of the electrode establishing a cutting zone along the article surface opposite the electrode, and causing the electrode to emit an electrical spark discharge to effect cutting of a groove in the article as the article and the electrode are moved relative to one another while a constant flow of fluid is directed across the cutting zone.

16. In a method of finish machining grooves in articles while in a heat treated hardened state, the steps of disposing a pair of articles in side-by-side spaced relation, providing a tapered electrical discharge electrode having a configuration corresponding to the taper to be machined in the grooves, connecting the articles to a positive pole of a source of direct current supply, the negative pole whereof is connected to the electrode, and aligning and moving the electrode in the gap between the spaced articles while contemporaneously rotating the articles toward the electrode in arcuate paths of rotation establishing a cutting zone along the roll surfaces on opposite sides of the electrode, and causing a spark discharge between the electrode and the articles and thereby cutting a taper in the grooves as the articles and the electrode are moved relative to one another while a constant flow of fluid is directed across the cutting zone thus preventing the formation of an arc.

17. In an apparatus for machining a groove in an article while in a heat treated hardened state which includes means for supporting an article, a tapered electrical discharge electrode having a configuration corresponding to the groove shape to be machined in the metal article being mounted adjacent the article, means for moving the electrode tangentially of the article while contemporaneously moving the article in an arcuate path of rotation on a side of the electrode to establish a cutting zone along the article surface opposite the electrode, means for directing a fluid stream at the cutting zone, and means for causing the tapered electrode to emit an electrical spark discharge to effect cutting of the groove in the opposed surface of the article while a constant flow of fluid is maintained about the cutting zone.

18. A method of forming a metal forming roll comprised of steel which comprises forming a cylindrical roll blank, forming a bore through the roll, heat treating the steel roll into a hardened state, and burning a circumferentially tapered arcuate groove in a radially outer surface of the heat treated hardened roll with an electric spark discharge in a fluid bath whereby the tapered arcuate groove is formed to shape without impairment of the heat treatment characteristic of the steel.

19. In a method for machining metal rolls, the steps of providing an electrical discharge electrode having a longitudinally tapered smooth uninterrupted outer surface corresponding to the configuration to be machined in the metal roll, positioning the electrode in lateral tangency to and generally beside the metal roll to be machined, energizing the electrode causing the tapered electrode to emit an electrical spark discharge, and causing a tangential surface of the roll to rotate along the length of the electrode establishing a cutting zone along the tangential surface opposed to the electrode enabling machined particles to fall vertically away from the cutting zone while a stream of fluid is directed across the cutting zone thereby forming a tapered groove extending generally in an arcuate direction.

References Cited in the file of this patent

UNITED STATES PATENTS

| 832,304 | Farrington | Oct. 2, 1906 |
| 1,395,607 | Sorensen | Nov. 1, 1921 |
| 2,902,584 | Ullmann | Sept. 1, 1959 |
| 2,920,180 | Ullmann et al. | Jan. 5, 1960 |

FOREIGN PATENTS

| 637,793 | Great Britain | May 24, 1950 |
| 498,007 | Belgium | Jan. 2, 1951 |

OTHER REFERENCES

Tool Engineer Handbook A.S.T.E., 1949, 1st ed., p. 512.

Aircraft Production, "Electric-Spark Erosion," August 1952, pages 271–274.

The Making, Shaping and Treating of Steel, U.S. Steel, 7th ed., 1957, pp. 431–440.